United States Patent Office 2,840,680
Patented June 24, 1958

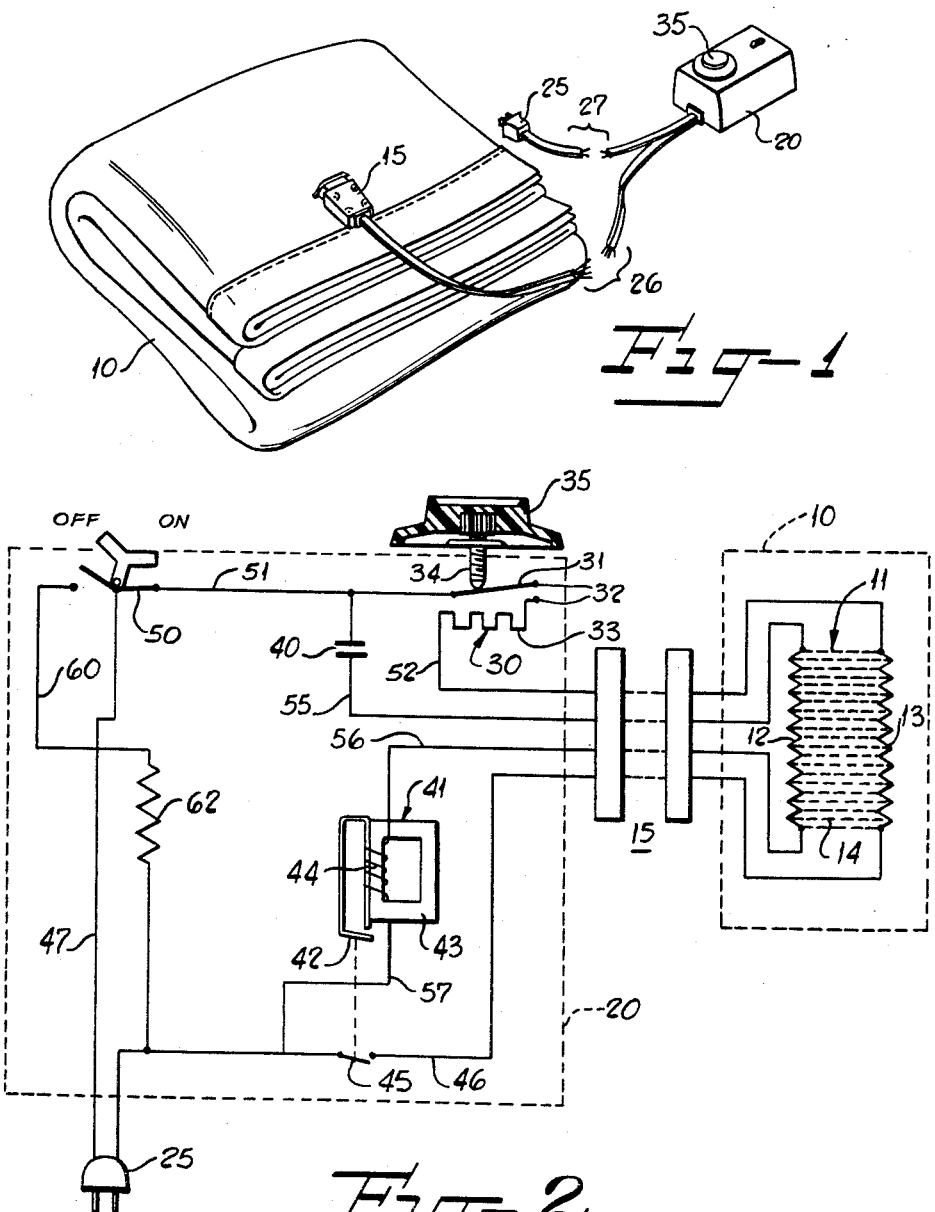

2,840,680

HEAT COMPENSATOR FOR ELECTRIC BLANKET CONTROL UNITS

Edwin Ray Mills, Leaksville, N. C., assignor, by mesne assignments, to The New York Trust Company, a corporation of New York, and John H. Baile, Saddle River, N. Y., as trustees Application September 17, 1956, Serial No. 610,251

3 Claims. (Cl. 219—20)

This invention relates to temperature responsive control systems for controlling the ultimate temperature of electrically heated fabrics, such as electric blankets, sheets and the like, and it is a primary object of this invention to provide such a control system with means to insure efficient response of the control system to ambient temperature upon each initial activation of the system.

Heating elements of electric blankets and similar electric heating devices are generally controlled by a control unit housed in a relatively small control box or case. Control units of this type are disclosed in a patent to William K. Kearsley, No. 2,195,958, issued April 20, 1940, a patent to George C. Crowley, No. 2,565,478, and others, as well as a pending application of Leslie A. Barr et al., Serial No. 457,247, filed September 20, 1954, now Patent No. 2,777,932, and entitled Temperature Responsive Control Circuits. The control box or case contains a cycling comfort control including a bimetallic element which responds to ambient temperature for opening and closing the circuit to the heating element in the blanket to maintain the blanket at a predetermined temperature and, in addition, such control boxes contain a safety circuit. The safety circuit includes various elements which, in addition to serving control functions, also act as an extraneous heat source within the control case and such elements may include resistors, inductor relays, and the like, to which current flows when the control unit is in use and which, for reasons of cost, simplicity, and appearance, are contained in the same case as the bimetallic element. A series heater is provided closely adjacent the bimetallic element, which heater is operated concurrently with the load; that is, the heating element of the blanket, to open the contacts of the cycling control.

Now, the resistors and/or inductor relay are slow to heat as compared to the series heater and are generally more remotely located from the bimetallic element than the heater so that, during the initial operation, the bimetal is not materially influenced by the extraneous heat dissipated from the resistors and/or inductor relay source. Thus, the heater must heat beyond its normal steady state value in order to cause the bimetallic element to open the contacts of the cycling control, so the control unit has a tendency to cause the blanket to initially heat to a higher temperature than its steady state temperature so the user may feel too warm during the initial heating period and reset the control for a lower temperature and fall asleep. After the initial preheating has stabilized, the user may be awakened by the depressed blanket temperature caused by the previously low temperature setting on the control.

Therefore, it is another object of this invention to provide means for heating the interior of the control box while the control unit is not in use, to maintain a predetermined temperature within the case substantially equal to that to which the interior of the case is ultimately heated by said extraneous heat source following activation of the control.

It is a more specific object of this invention to provide an auxiliary electric heater or resistor within the control box which is energized whenever the control unit is not in use for maintaining a predetermined temperature within the control box and wherein means are provided to de-energize the auxiliary heater or resistor upon activation of the control unit whereby, as said extraneous source becomes effective, the heat of the auxiliary resistor or heater proportionally diminishes thereby avoiding the tendency of the control to cause the blanket to initially heat to a higher temperature than that desired by the user, so the control may be set for the temperature desired by the user and may remain at such a position throughout operation of the circuit.

Some of the objects of the invention having been stated, other objects will appear as the description proceeds when taken in connection with the accompanying drawings, in which—

Figure 1 is a perspective view of an electric blanket showing a control box or case for a control unit interposed in an electrical circuit to the blanket;

Figure 2 is a circuit diagram illustrating the parts of the control unit contained within the control box and showing the same connected with a load embodied in the heating element of the blanket;

Figure 3:
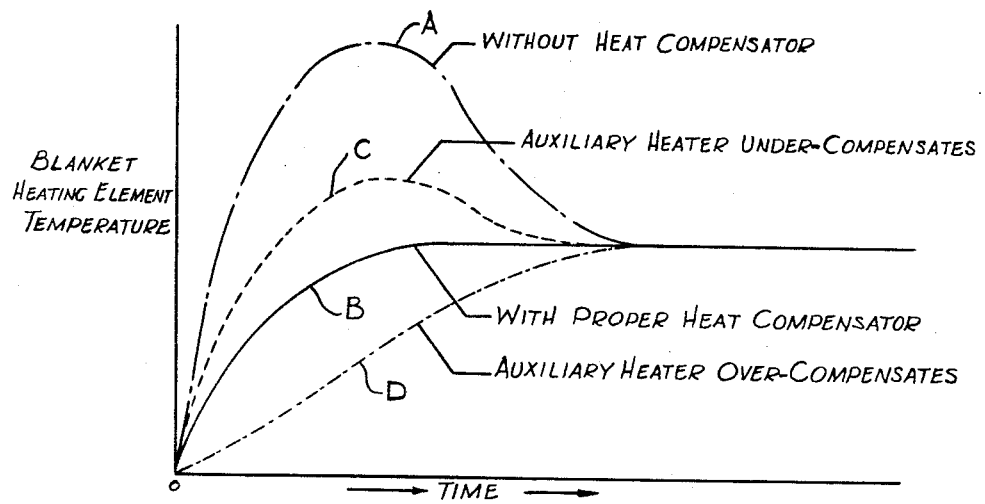
Figure 3 is a diagram illustrating relative heat curves with respect to a blanket heating temperature under varying conditions.

Referring more specifically to the drawings, the numeral 10 designates an electric blanket which is exemplary of similar electric heating devices and which contains a heating element broadly designated at 11. The element 11 may be termed as a combined heating and thermo-sensitive element and is preferably of a type substantially as disclosed in a U. S. patent to David C. Spooner, Jr., et al., No. 2,581,212, issued January 1, 1952, or in a U. S. patent to Benjamin T. Vogler, No. 2,725,447, issued November 29, 1955. The combined heating and thermo-sensitive element 11 may be arranged inside the blanket 10 in a series of convolutions or in other patterns and may be positioned in passages provided therefor as described in U. S. Patent No. 2,203,918, issued July 11, 1940, to I. O. Moberg.

As described in said Spooner et al. patent, the combined heating and thermo-sensitive element 11 includes two generally parallel conductors 12 and 13 which are covered with organic material 14, such as nylon, which is characterized by the fact that it becomes more conductive as temperature rises; that is, the organic material 14 is essentially an insulator at normal operating temperatures of the element 11 and, at predetermined higher temperatures, it is a conductor of electricity. The heating element 11 is joined through a multi-terminal plug and socket 15 or connector unit to a control unit which is housed in a control box or case 20. Means for connecting the control unit to a source of electrical energy is provided by a plug 25. In Figure 1, the conductors between the plug and socket 15 and the control box 20 are shown extending through a pliable cable 26 and the conductors leading from the control box 20 to the plug 25 are housed in a pliable cable 27.

Referring again to the combined heating and thermo-sensitive element 11, only one of the conductors (conductor 13) is used in warming the blanket 10; the other conductor 12 being a control or "feeler." Thus, since the material 14 separating these conductors is thermo-sensitive and becomes conductive at elevated temperatures, when an over-heated condition or "hot spot" develops in the blanket through mis-use or other abnormal operations, the temperature of the heating element necessarily rises and a conductive path develops between the feeler and heater conductors 12, 13 and shunts the current around an inductor in the control unit to be presently described.

As heretofore stated, the present invention is embodied in means to maintain a substantially constant temperature within the case 20 when the control unit is not in use and to thereby maintain the operating elements of the circuit of the control unit within the control box or case 20 at a substantially constant temperature equal to the operational temperature of said components. The circuit of the control unit may vary and is shown as being of a type disclosed in said pending application of Leslie A. Barr et al., Serial No. 457,247, filed September 20, 1954, which circuit includes a series resonant circuit consisting of inductive and capacitive reactance, wherein a change in temperature of the electric blanket 10 is linked with the resonant circuit in such a manner as to change the resonant condition, which change in resonance is, in turn, registered by associated means and used to cut off the supply of power to the heating element 11 in the blanket 10.

The control unit or circuit within the case 20 includes an ambient cycling control or comfort circuit broadly designated at 30 and including a bimetallic element or plate 31, contacts 32, series heater 33 and an adjusting screw 34, which adjusting screw 34 penetrates one wall of the case 20 and has a control knob 35 fixed thereto and disposed exteriorly of the case or control box 20. This ambient control is functioned primarily by room temperature. If the room temperature decreases, the bimetallic element 31 causes contacts 32 to close and current is supplied to the blanket through the series heater 33. After some time, this series heater 33 causes a temperature rise in the bimetallic element 31 and the contacts 32 are opened. The ambient control 30 will continue to cycle so long as room temperature is at, or lower than, that temperature at which the bimetallic element will cause closing of contacts 32. The adjustment 34 permits manual adjustment of the bimetallic element 31 to obtain the desired blanket temperature.

The ambient control 30 is, therefore, a measure of room temperature and the integrated time interval of current applied to the blanket. Should an over-heated condition occur in the blanket, such as by excessive folding of the blanket while in use, the thermo-sensitive element 14, separating the heater conductor 13 and the feeler conductor 12, becomes conductive and permits current to flow between the conductors 12, 13. This flow of current is the signal which is used by the series resonant safety circuit hereinafter described to interrupt the flow of current to the electric blanket to avoid the danger that might develop from a locally over-heated blanket.

Although a comfort circuit and a safety circuit are defined herein, it is apparent that these circuits are necessarily integrated as a single circuit, control unit or system.

The series resonant circuit disposed within the case 20 includes a capacitor 40 and an inductor relay broadly designated at 41. The inductor relay 41 comprises a magnetically related relay 42, an inductor 43 and a coil 44. The relay is connected with a switch element 45 interposed in a lead conductor 46 extending from one end of the conductor 13 of the heating element 11 through the connector 15 to one side of the plug 25. The other side of the plug 25 has a conductor 47 leading therefrom to the center tap of a toggle switch or double throw single pole switch 50 which, during activation of the control unit establishes contact between the conductor 47 and a conductor 51 leading to bimetallic element 31. It will be noted that the heater 33 of the ambient control 30 has a conductor 52 leading therefrom which is connected to the resistance or conductor 13 of the heating element 11 by means of the connector or plug and socket 15.

The connector or plug and socket 15 also serves to connect opposite ends of the feeler conductor or resistance 12 to conductors 55, 56 in the case 20, the other end of conductor 55 being connected to a medial portion of conductor 51 and having the capacitor 40 interposed therein. The conductor 56 is connected to one side of the coil 44 of the inductor relay 43, the other side of the coil 44 having a conductor 57 leading therefrom to the conductor 46 at a point between the switch 45 and the plug 25 and within the control box 20.

For purposes of description, it shall be assumed that the manually controlled switch 50 occupies closed position when it occupies the position shown in Figure 2 and the control unit is activated and, on the other hand, when the switch is moved in a counterclockwise direction in Figure 2, the switch is open, but actually establishes contact between a conductor 60 and the lead conductor 47, the end of the conductor 60 remote from the switch 50 being connected to the conductor 46 adjacent the plug 25 and having an auxiliary heater or resistor 62 interposed therein, which resistor is the predominant element of the present invention. More than one resistor may be used provided that the capacity of the auxiliary heat source represented thereby is substantially equal to the extraneous heat produced by those heat producing elements within the control case, other than the usual heat producing series resistor in the comfort control, such as the inductor relay 41.

In operation, at peak resonance, the relay 42 and associated switch 45 are closed due to available leakage flux. Thus, a circuit is completed through the ambient control 30 and heater conductor 13 of the blanket 10. When the flux changes in inductor 43 from a condition of saturation as on peak resonance to a level below saturation, there is insufficient leakage flux available to hold in the relay 42 with the result that switch 45 opens and the flow of current to the heating conductor 13 of the heating element 11 in the blanket 10 is interrupted. The flux change, of course, occurs when the insulation 14 becomes conductive to a predetermined value, as on localized over-heating of the blanket, thereby reducing the current flowing in inductor coil 44.

Now, assuming that the auxiliary heater or resistor 62 is not present in the control unit 20, as has heretofore been the case, and the temperature within and without the box 20 is relatively low, the switch 50 is moved to "on" or closed position to activate the control unit within the control box 20. The contacts 32 would then be closed to energize the heater 33 of the ambient control 30 and the conductor 13 of the heating element 11, since, at this time resonance is produced and closes the switch 45.

In order for the user to feel comfortably warm, the screw 34 is adjusted for a certain temperature and, since the blanket is heated concurrently with the ambient control series heater 33, this causes a temperature rise in the bimetallic element 31 and the contacts 32 are opened. On the other hand, as the temperature of the heater 33 and the blanket 10 decreases, the contacts 32 of the ambient control 30 close and this cycle is repeated over and over again. However, during the initial cycles of operation of the ambient control 30, the extraneous heat source, exemplified by the inductor relay 41 gradually becomes heated and emanates or gives off such heat as to also cause the bimetallic element 31 to open the contacts 32 of the ambient control or cycling control.

Therefore, to counteract the effect of not having heat available from the extraneous heat source, when the control unit is first activated by closing the switch 50 as shown in Figure 2 and the screw 34 is adjusted for an anticipated steady state blanket temperature, the series heater 33 of the ambient control 30 must heat beyond its steady state value in order to cause the bimetallic element to open the contacts of the cycling control with the result that the blanket will also heat beyond its eventual steady state value until the extraneous heat source or inductor relay 41 has heated the interior of the box 20 to its maximum capability. The result is that the user may feel too warm during the initial heating period and reset the control for a lower temperature and fall asleep. However, after the initial upsurge of the heat has terminated, due to the inductor relay reaching its maximum heat out-put and as indicated by the curved dash-dot line A in Figure 3, the control will lower the temperature to the reset lower value and the user may be awakened by the depressed temperature and must again reset the ambient control 30 to maintain the blanket 10 at the desired optimum temperature.

Figure 4:
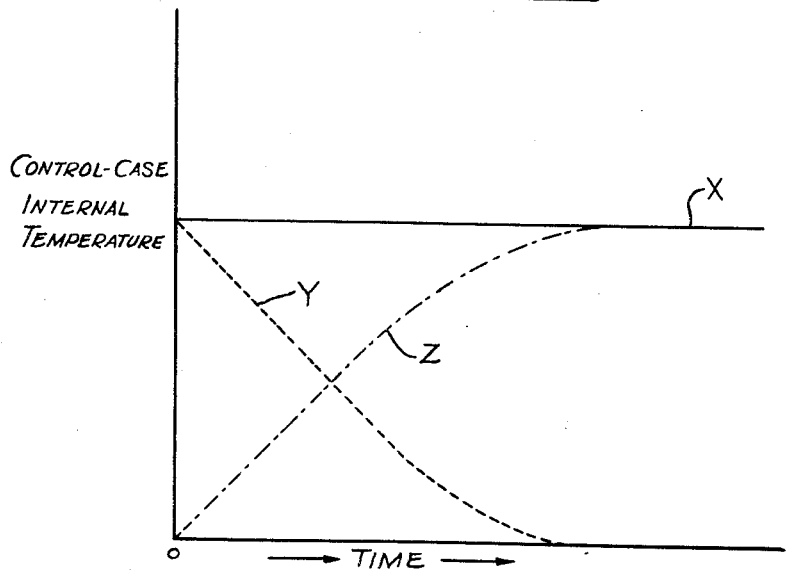
Figure 4 is a diagram illustrating the optimum desired temperature to be maintained within the control box or case and the gradually rising heat curve of the extraneous heat source compared with the gradually diminishing heat curve of the auxiliary heater or resistor upon initial activation of the control unit.

In order to overcome this defect, I have provided the auxiliary control box heater 62 which is shown in the form of a resistor in Figure 2 and, depending somewhat upon its location, this resistor 62 should have a capacity for heating the interior of the box 20, and particularly, the ambient control heater 33 and the bimetallic element 31 to a temperature substantially equal to the temperature to which the bimetallic element 31 and the heater 33 are heated by the extraneous heat source as embodied in the inductor relay 41. Thus, when the switch 50 occupies "off" position, current flows through the resistor or auxiliary heater 62 while the remaining components of the control unit are inactive. Conversely, when the switch 50 is closed; that is, moved from "off" to "on" position, the flow of current through the resistor or auxiliary heater 62 is interrupted so the control case internal temperature is maintained substantially constant as indicated by the solid line X in Figure 4, since, when the switch 50 is moved to said closed position, the heat emanated from the resistor 62 gradually diminishes substantially as indicated by the dash line Y in Figure 4 while the heat emanated by the inductor relay 41 gradually increases substantially as indicated by the dash-dot line Z in Figure 4.

Thus, when the control unit is to be used, the control knob 35 and screw 34 may be adjusted to the desired temperature and, upon the switch 50 being moved to "on" position, the heating element 11 in the blanket 10 gradually heats to the desired optimum temperature substantially as indicated by the regularly curved solid line B in Figure 3. It will be noted that there is no up-surge of temperature of the heating element in the blanket 10 when the resistor 62 is at the proper value to compensate for the heat from said extraneous source. In the event that the auxiliary heater or resistor 62 is of too low a value to compensate for the extraneous heat source embodied in the inductor relay 41, there may be a slight up-surge in the temperature of the blanket heating element 11 as indicated by the broken line C in Figure 3. On the other hand, in the event of the value of the auxiliary heating unit or resistor 62 being too high, a heat curve substantially as indicated at D in Figure 3 may result and, after some time it may be necessary for the user to reset the control unit to a higher value, since the temperature within the case 20 would drop after the switch is moved from "off" to "on" position and this would require that the ambient control heater 33 need emanate a lesser amount of heat in order to cause a sufficient temperature rise in the bimetallic element 31 to open the contacts 32. The curves A, B, C, D may vary and are shown for purposes of illustrating relative heat conditions. Actually, it has been found that the heat curve of the blanket heating element may vary between C and D (Figure 3) with satisfactory results.

In the drawings and specification there has been set forth a preferred embodiment of the invention, and although specific terms are employed they are used in a generic and descriptive sense only and not for purposes of limitation, the scope of the invention being defined in the claims.

I claim:

1. A control system for a thermo-sensitive heating element of an electric blanket comprising a cycling control circuit including a heater in series with said element for intermittently effecting the flow of current to the heating element, a series resonant circuit including an inductor relay linked with the blanket for cutting off the supply of power to the heating element when an overheated condition develops in the blanket, a case within which the heater and the inductor relay are contained, a manually operable switch interposed in a circuit between a source of current and the heater and the inductor relay, a resistor disposed within said case, means to electrically energize the resistor during intervals in which said switch is open and to de-energize the resistor during intervals in which said switch is closed, and the resistor having a capacity to heat the interior of said case to an extent substantially equal to the extent to which the interior of said case is heated by said inductor relay when the switch is closed.

2. A control system for a thermo-sensitive heating element of the type having a heating conductor, a feeler conductor and a material separating said conductors, which material becomes conductive at elevated temperature, said system including a bimetallic element and a series heater interposed in a comfort circuit from a source of current to said heating conductor, a case containing said bimetallic element and said heater, an inductor relay in said case connected with said source of current and said feeler conductor to form a series resonant safety circuit, normally closed contacts interposed in said comfort circuit and adapted to open upon said material becoming conductive and thereby disturbing the resonance of said safety circuit, a manually operable switch for making and breaking the flow of current to both circuits, at least one resistor within said case, means to cause current to flow through the resistor when said switch breaks the flow of current through said circuits and to break the flow of current to the resistor when the switch makes current flow through said both circuits, and said resistor serving to heat the interior of said case to substantially the same temperature as that to which the interior of the case is heated by said inductor relay whereby the internal case temperature is maintained substantially uniform regardless of the position of said switch.

3. A control system for a thermo-sensitive heating element of an electric blanket including a control box, cycling control means including at least one electrical heat generating member located in said box and being interposed in an electrical circuit from a source of current to said heating element, a manually operable switch in said circuit disposed between the source and the heat generating member whereby the switch, when closed, energizes said member, and means responsive to opening said switch for maintaining the interior of said box at a temperature substantially compensating for the loss of heat resulting from the consequent de-energization of said heat generating member.

References Cited in the file of this patent
UNITED STATES PATENTS

| 2,479,319 | Crowley et al. | Aug. 16, 1949 |
| 2,709,216 | Moran et al. | May 24, 1955 |
| 2,777,932 | Barr et al. | Jan. 15, 1957 |
| 2,779,852 | Weber | Jan. 29, 1957 |